United States Patent
Hetzler et al.

(10) Patent No.: US 7,270,870 B2
(45) Date of Patent: Sep. 18, 2007

(54) MULTI-LAYER POLYMER FILM

(75) Inventors: Kevin G. Hetzler, Sparta, NY (US);
Alexander Tukachinsky, Holden, MA (US); Boris M. Friedman, Guttenberg, NJ (US); Paul W. Ortiz, Wayne, NJ (US)

(73) Assignee: Saint Gobain Performance Plastics Corporation, Wayne, NJ (US)

( * ) Notice: Subject to any disclaimer, the term of this patent is extended or adjusted under 35 U.S.C. 154(b) by 256 days.

(21) Appl. No.: 10/862,053

(22) Filed: Jun. 4, 2004

(65) Prior Publication Data

US 2005/0271867 A1    Dec. 8, 2005

(51) Int. Cl.
*B32B 27/06* (2006.01)
*B32B 27/28* (2006.01)

(52) U.S. Cl. ...................... 428/212; 428/421
(58) Field of Classification Search ........... 428/212, 428/421, 422
See application file for complete search history.

(56) References Cited

U.S. PATENT DOCUMENTS 5,941,286 A    8/1999  Fauble et al.
6,610,807 B2 *  8/2003  Duchesne et al. .......... 526/250
2003/0198770 A1  10/2003 Fukushi et al.
2003/0198771 A1*  10/2003 Fukushi et al. ........ 428/36.91
2005/0025923 A1*  2/2005 Saupe et al. ............ 428/36.91

FOREIGN PATENT DOCUMENTS

| DE | 298 22 036 U1 | 2/1999 |
| EP | 0 658 943 A1 | 6/1995 |
| EP | 0 680 095 A2 | 11/1995 |
| EP | 0 992 518 A1 | 4/2000 |
| EP | 1 039 199 A2 | 9/2000 |
| EP | 1 160 270 A1 | 12/2001 |
| EP | 1 249 338 A2 | 10/2002 |

* cited by examiner

*Primary Examiner*—Ramsey Zacharia
(74) *Attorney, Agent, or Firm*—Larson Newman Abel Polansky & White LLP; Chi Suk Kim

(57) ABSTRACT

The disclosure is directed to a polymer film including a first layer and a second layer. The first layer includes a first fluoropolymer and has a melting point less than 135° C. The second layer overlies the first layer and includes a second fluoropolymer. The second layer has a melting point greater than 135° C.

63 Claims, 1 Drawing Sheet

MULTI-LAYER POLYMER FILM

TECHNICAL FIELD OF THE DISCLOSURE

This disclosure, in general, relates to multi-layer fluoropolymer films.

BACKGROUND

Manufactured articles and devices are often laminated with polymeric films. These polymeric films provide mechanical and chemical protection to the manufactured article. For example, films having desirable mechanical properties may protect articles from abrasion or impact and films that have desirable chemical resistance may provide protection from exposure to chemicals and the environment. In one exemplary embodiment, polymeric films may be used to provide impact resistance, moisture barriers, and soiling resistance to an article.

In one particular embodiment, polymeric films are used to protect photovoltaic cells, photo sensors, and displays. For example, transparent polymer films may be used to protect photovoltaic cells from environmental hazards such as moisture and oxygen and from mechanical hazards, such as impact and abrasion. Ethylene vinyl acetate (EVA) films are typically used for photovoltaic cell encapsulation in combination with an overlying protective layer of ethylene-tetrafluoroethylene copolymer (ETFE). EVA provides a low-melting point soft polymer suitable for encapsulation by melting, while ETFE provides a relatively hard surface with heat and weather resistance, and is water and dirt repellant. Typically, a photovoltaic cell is coated with melted EVA and the EVA is cured or cross-linked. The curing of the EVA takes a significant amount of time, making continuous lamination processing difficult using EVA. In addition, the ETFE film is generally extruded separately and pretreated on one side for adhesion to EVA. While the EVA and ETFE films initially provide desirable protection, EVA is known to age poorly, losing optical clarity and producing corrosive byproducts. As such, aging EVA films may reduce the amount of solar energy that reaches the photovoltaic cell. Additionally, the aging EVA may damage the underlying photovoltaic cell with corrosive degradation byproducts such as acetic acid produced during degradation of the EVA. As such, an improved polymeric film would be desirable.

SUMMARY

In one particular embodiment, the disclosure is directed to a polymer film including a first layer and a second layer. The first layer includes a first fluoropolymer and has a melting point less than 135° C. The second layer overlies the first layer and includes a second fluoropolymer. The second layer has a melting point greater than 135° C.

In another exemplary embodiment, the disclosure is directed to a polymeric film, including a first layer and a second layer. The first layer includes a first fluoropolymer. The second layer overlies the first layer and includes a second fluoropolymer. The difference between a melting point of the first layer and a melting point of the second layer is at least 10° C.

In a further exemplary embodiment, the disclosure is directed to a polymeric film including a first layer and a second layer. The first layer includes a first fluoropolymer. The second layer overlies the first layer and includes a second fluoropolymer. The second fluoropolymer comprises greater fluorine content than the first fluoropolymer.

In another exemplary embodiment, the disclosure is directed to a polymer film including a first layer and a second layer. The first layer includes a first THV copolymer. The second layer overlies and is in direct contact with the first layer. The second layer includes a second THV copolymer. The second THV copolymer is fluorinated to a greater extent than the first THV copolymer.

DETAILED DESCRIPTION

Figure 1:
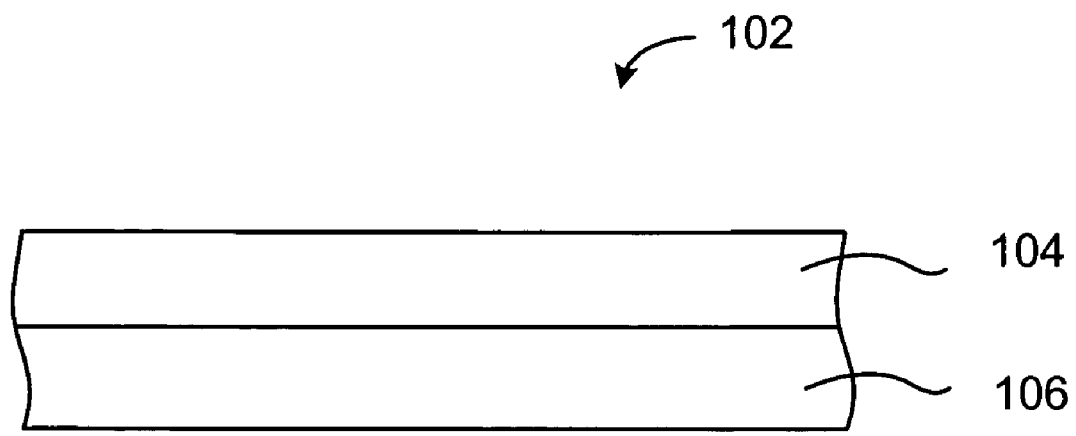
FIGS. 1 and 2 include illustrative examples of multi-layer films.

In one particular embodiment, the disclosure is directed to a polymer film including first and second layers. The first layer includes a first fluoropolymer and the second layer includes a second fluoropolymer. The second layer has a higher melting point than the first layer. The second layer generally overlies the first layer, and according to one embodiment, is in direct contact with the underlying layer. In alternate embodiments, intervening layers may be present between the first and second layers.

In use as a laminate for a manufactured article, the film is generally heated to at least the melting point of the first layer, but at a temperature that is lower than the melting point of the second layer. The film is rolled or pressed onto the article such that the first layer contacts the article. Exemplary laminated articles include photovoltaic cells, photosensors, and displays. The polymer films may be used in batch laminating and continuous laminating processes. For example, the film may be applied over a pre-sized photovoltaic sheet and pressed in a batch laminating process. In another example, the film is rolled onto a continuous photovoltaic sheet in a continuous laminating process.

The first and second fluoropolymers of the first and second layers, respectively, may be formed of polymers and copolymers formed of fluorinated monomers. Copolymers include graft copolymers, alternating copolymers, random copolymers, and block copolymers. Exemplary fluoropolymers may be formed of monomers including tetrafluoroethylene (TFE), hexafluoropropylene (HFP), perfluoropropyl or perfluoromethyl vinyl ether, chlorotrifluoroethylene (CTFE), vinylidene fluoride ($VF_2$ or VDF), and vinyl fluoride (VF). The fluoropolymers may include polymers, polymer blends and copolymers including one or more of the above monomers, such as fluorinated ethylene propylene (FEP), ethylene-tretrafluoroethylene (ETFE), poly tetrafluoroethylene-perfluoropropylether (PFA), poly tetrafluoroethylene-perfluoromethylvinylether (MFA), poly tetrafluoroethylene (PTFE), poly vinylidene fluoride (PVDF), ethylene chloro-trifluoroethylene (ECTFE), poly chloro-trifluoroethylene (PCTFE), and tetrafluoroethylene-hexafluoropropylene-vinylidene fluoride (THV). In further exemplary embodiments, the fluoropolymers may be copolymers of alkene monomers with fluorinated monomers, such as Daikin™ EFEP by Daikin America, Inc.

Generally, the first and second layers are primarily formed of respective fluoropolymers, such that, in the case of polymer blends, non-fluorinated polymers are limited to less than 15 wt %, such as less than 10 wt %, less than 5 wt % or less than 2 wt % of the total polymer content. In a certain embodiment, the polymeric content of the first and second layers is essentially 100% fluoropolymer. In some embodiments, the layers consist essentially of the respective fluoropolymers described above. As used herein, the phrase "consists essentially of" used in connection with the fluoropolymers precludes the presence of non-fluorinated polymers that affect the basic and novel characteristics of the fluoropolymer, although, commonly used processing agents and additives such as antioxidants, fillers, UV agents, dyes, and anti-aging agents may be used in the polymeric layers.

In one particular embodiment, the first and second fluoropolymers may be copolymers formed of the monomers TFE, HFP, and VDF, such as THV copolymer. The THV copolymer may include Dyneon™ THV 220, Dyneon™ THV 2030GX, Dyneon™ THV 500G, Dyneon™ THV X815G, or Dyneon™ THV X610G. For example, the copolymer may include about 20-70 wt % VDF monomer, such as about 35-65 wt % VDF monomer. The copolymer may include about 15-80 wt % TFE monomer, such as about 20-55 wt % TFE monomer. In addition, the copolymer may include about 15-75 wt % HFP monomer, such as about 20-65 wt %. In one embodiment, a lower melting point copolymer includes at least 50 wt % VDF monomer, such as about 55 wt % VDF monomer or about 60 wt % VDF monomer. In another embodiment, the higher melting point copolymer includes not more than about 50 wt % VDF monomer, such as not more than about 45 wt % VDF monomer or not more than about 40 wt % VDF monomer.

FIG. 1 includes an illustration of a film 102, including a layer 104 and a layer 106. Layer 104 is formed of a fluoropolymer and layer 106 is formed of a fluoropolymer. Layer 104 has a higher melting point than layer 106. In the embodiment shown, layer 104 and layer 106 may be coextruded. As illustrated, layers 104 and 106 may be coextruded to be in direct contact with each other, such that the layers 104 and 106 have no intervening layers between them.

In one particular example, the polymeric film has thickness greater than 2 mils, such as greater than 3 mil, greater than 4 mil, or greater than 5 mil. The layer 104 may comprise no more than about 95% of the thickness of the multi-layer film. For example, the layer 104 may comprise not greater than about 35%, not greater than about 30%, not greater than about 25%, not greater than about 20%, or not greater than about 15% of the multi-layer film thickness. Layer 106 may comprise at least about 5% of the multi-layer film thickness, such as at least about 50%, at least about 65%, at least about 75%, at least about 80%, or at least about 85% of the multi-layer film thickness. In one particular embodiment, the ratio of layer 104 thickness to the thickness of layer 106 may be in the range of about 5:95 to about 95:5, such as a range of about 10:90 to about 50:50 and a range of about 10:90 to about 30:70. In one particular embodiment, the ratio is about 20:80.

In one exemplary embodiment, layer 104 has a melting point of greater than 135° C. Layer 106 has a melting point less than about 135° C. For example, layer 104 may have a melting point that is at least about 160° C., at least about 180° C., or at least about 220° C. Layer 106 may, for example, have a melting point less than 135° C., such as not greater than about 125°, not greater than about 120°, not greater than about 115° C., or not greater than about 110° C.

The difference between the melting point of layer 104 and the melting point of layer 106 is generally at least about 10° C. For example, the melting point difference between the melting point of layer 104 and that of layer 106 is at least about 25° C., at least about 40° C., at least about 60° C., or at least about 100° C.

In another exemplary embodiment, layer 104 includes a fluoropolymer having a higher fluorinated content than the fluoropolymer of layer 106. For example, the fluoropolymer of layer 104 may include a greater number of fluorine atoms than the fluoropolymer of layer 106. Additionally or alternatively, the fluoropolymer of layer 104 may include a greater number of fluorinated carbons than the fluoropolymer of layer 106. In one particular example, the layer 104 fluoropolymer and the layer 106 fluoropolymer are copolymers, including monomers TFE, HFP, and VDF, such as THV copolymer. Here, the layer 104 fluoropolymer may have a lower weight percentage of VDF monomer than the layer 106 fluoropolymer. In another example, the layer 104 fluoropolymer includes a greater weight percentage of HFP monomer than the layer 106 fluoropolymer. In a further example, the layer 104 fluoropolymer includes a greater weight percentage of TFE monomer than the layer 106 fluoropolymer.

In other exemplary embodiments of the polymer film 102, layer 104 may be formed of PVDF, THV, ETFE, EFEP or PCTFE and layer 106 may be formed of PVDF or THV. For example, layer 104 may be formed of Dyneon™ THV 500G, Dyneon™ THV x815G, or Dyneon™ THV x610G. Layer 106 may, for example, be formed of PVDF, Dyneon™ THV 220, or Dyneon™ THV 2030Gx.

In one particular example, the polymer film 102 formed of the layers (104 and 106) has a minimum optical clarity for transmission of light. For example, the polymer film may have an optical clarity of at least 85% light transmission, such as 85% light transmission of light in the visible spectrum. For example, the optical clarity may permit at least 90% light transmission, at least about 92% light transmission, at least about 95% light transmission, at least about 98% light transmission, or at least about 99% light transmission. The optical clarity may, for example, be measured by a BYK-Gardner Haze-Gard Plus.

In addition, the polymer film may have qualities such as weatherability, non-soiling performance, mechanical toughness, moisture barrier performance, UV stability, bondability to articles, and dielectric performance.

The polymer film illustrated in FIG. 1 may include additional fluoropolymer layers. These additional layers may overlie layer 104. For example, the polymer film 102 may include layers formed of ETFE, PCTFE, EFEP, or PVDF. These additional layers may be coextruded with layers 104 and 106.

Figure 2:
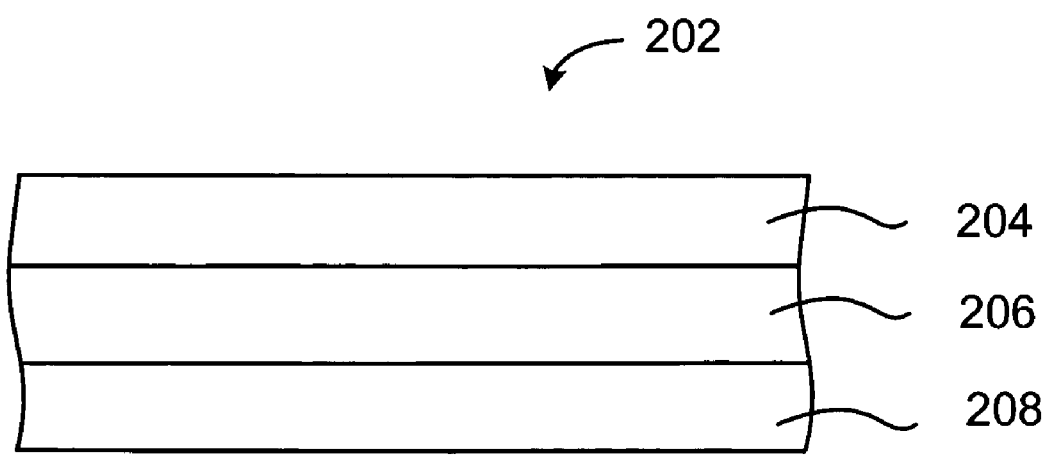

FIG. 2 illustrates an alternate embodiment of a multi-layer polymer film 202 that includes layers 204, 206, and 208. Layers 206 and 208 are similar to layers 104 and 106, respectively, as described above. Layer 208 may include fluoropolymer layer having a lower melting point than layers 206 and 204. Layer 206 may include a fluoropolymer having a higher melting point than layer 208. Similarly, layer 204 may have a higher melting point than layer 208. In one exemplary embodiment, layer 204 may function as a barrier layer, weather resistant layer, or self-cleaning layer. Layer 204 may, for example, include a PCTFE barrier layer or an ETFE overlying layer.

In one exemplary embodiment, layer 206 has a melting point greater than 135° C., such as at least about 160° C., at least about 180° C., or at least about 220° C. Layer 208 has a melting point less than 135° C., such as not greater than about 125° C., not greater than about 120° C., not greater than about 115° C., or not greater than about 110° C.

In another embodiment, layer 206 has a melting point at least about 10° C. higher than the melting point of layer 208, such as at least about 25° C. higher, at least about 40° C. higher, at least about 60° C. higher, or at least about 100° C. higher.

In a further exemplary embodiment, layer 206 includes a fluoropolymer that has a higher fluorinated content than the fluoropolymer of layer 208. For example, layers 206 and 208 may be formed of THV copolymer and layer 206 may include a greater percentage of TFE or HFP or a lower percentage of VDF than layer 208. Additional details of layers 206 and 208 may be found in connection with layers 104 and 106, respectively.

In one exemplary embodiment, the low melting point layer may include a fluoropolymer, such as THV 220 by Dyneon™. In another exemplary embodiment, the low melting point fluoropolymer may include THV 2030GX by Dyneon™. Exemplary embodiments of a higher melting point fluoropolymer include Dyneon™ THV 500G, Dyneon™ THV 815G, and Dyneon™ THV 610G.

In one exemplary embodiment, the film is conducive for use in a continuous process, such as laminating over a long continuous sheet of substrate as opposed to placing and cutting film to fit sectioned sheets of substrate. For example, the film is conducive for laminating to a flexible photovoltaic layer that is processed into a roll and does not utilize cross-linking to bond to the photovoltaic surface.

In a further exemplary embodiment, the film is formed of fluorinated polymers and is often times free of chlorinated flouropolymers. Certain embodiments expressly preclude chlorinated fluoropolymers. In another exemplary embodiment, the film has an optical clarity greater than 95% light transmission, such as greater than 96% light transmission.

EXAMPLES

An exemplary embodiment of a multi-layer polymer film, including a first fluoropolymer layer that has a lower melting point than a second fluoropolymer layer. The fluoropolymer layers are coextruded as illustrated by Example 1.

Example 1

Fluoropolymer Dyneon™ THV X815G, with a melting point of 224° C., was processed on a ¾ inch Brabender extruder at 8 rpm. The temperatures by zone of the Brabender extruder were 220° C., 270° C., 260° C., and 260° C. Two additional layers were formed using fluoropolymer Dyneon™ THV 220G, having a melting point of 116° C. One layer of the two layers was processed on a 1" Killion extruder at 12 rpm. The temperatures by zone of the Killion extruder were 120° C., 170° C., 220° C., and 220° C. The other layer of the two layers was processed on a ¾ Brabender extruder at 8 rpm, and the temperatures by zone of the Brabender extruder were 120° C., 170° C., 220° C., and 220° C. The extruders fed an ABC-type feedblock held at a temperature of 240° C. and a die held at 230° C.

Exemplary films of 2 mil and 5 mil thickness having effectively two-layers, a Dyneon™ THV X815G layer and a Dyneon™ THV 220G layer, were produced with a thickness layer ratio (THV 815:THV 220) equal to 20:80.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A polymer film comprising:
   a first layer comprising a first fluoropolymer and having a melting point less than 135° C.;
   a second layer overlying the first layer and comprising a second fluoropolymer, the second layer having a melting point greater than 135° C.;
   wherein the polymer film is in the form of a sheet, the first layer forming an exterior surface of the sheet; and
   wherein the polymer film has an optical clarity of at least 85% light transmission.

2. The polymer film of claim 1, wherein the polymer film has an optical clarity of at least 90% light transmission.

3. The polymer film of claim 2, wherein the optical clarity is at least 92% light transmission.

4. The polymer film of claim 3, wherein the optical clarity is at least 95% light transmission.

5. The polymer film of claim 4, wherein the optical clarity is at least 98% light transmission.

6. The polymer film of claim 5, wherein the optical clarity is at least 99% light transmission.

7. The polymer film of claim 1, wherein the first layer and the second layer are coextruded.

8. The polymer film of claim 7, wherein the first layer and the second layer are in direct contact with each other.

9. The polymer film of claim 8, wherein no intervening layers are present between the first layer and the second layer.

10. The polymer film of claim 1, wherein the first fluoropolymer comprises fluoropolymer copolymer.

11. The polymer film of claim 10, wherein the fluoropolymer copolymer comprises TFE, HFP, and VDF monomers.

12. The polymer film of claim 1, wherein the second fluoropolymer comprises a fluoropolymer copolymer.

13. The polymer film of claim 1, wherein the second fluoropolymer has a greater number of fluorine atoms than the first fluoropolymer.

14. The polymer film of claim 1, wherein the second fluoropolymer has a greater percentage of fluorinated carbons than the first fluoropolymer.

15. The polymer film of claim 1, wherein the difference between the melting point of the first layer and the melting point of the second layer is at least about 10° C.

16. The polymer film of claim 15, wherein the difference is at least about 25° C.

17. The polymer film of claim 15, wherein the difference is at least about 40° C.

18. The polymer film of claim 15, wherein the difference is at least about 60° C.

19. The polymer film of claim 1, wherein the melting point of the second layer is at least about 160° C.

20. The polymer film of claim 1, wherein the melting point of the second layer is at least about 180° C.

21. The polymer film of claim 1, wherein the melting point of the second layer is at least about 220° C.

22. The polymer film of claim 1, wherein the first fluoropolymer comprises a first THV copolymer and the second fluoropolymer comprises a second THV copolymer, and wherein the second THV copolymer has a lower weight percentage of vinylidene fluoride than the first THV copolymer.

23. The polymer film of claim 1, wherein the first fluoropolymer comprises a first THV copolymer and the second fluoropolymer comprises a second THV copolymer, and wherein the second THV copolymer has a higher weight percentage of TFE than the first THV copolymer.

24. The polymer film of claim 1, wherein the first fluoropolymer comprises a first THV copolymer and the second fluoropolymer comprises a second THV copolymer, and wherein the second THV copolymer has a higher weight percentage of HFP than the first THV copolymer.

25. The polymer film of claim 1, wherein each of the first and second layers are free of chlorinated fluoropolymer.

26. The polymer film of claim 1, wherein the first layer and the second layer consist essentially of respective first and second fluoropolymers.

27. The polymer film of claim 1, wherein the polymer film has a total film thickness of greater than 2 mils.

28. The polymer film of claim 27, wherein the polymer film has a total film thickness in a range of about 2 mils to 5 mils.

29. The polymer film of claim 1, wherein a ratio of the thickness of the second layer to a thickness of the first layer is in a range of about 10:90 to about 30:70.

30. A polymer film comprising:
   a first layer comprising a first fluoropolymer and having a melting point less than 135° C.;
   a second layer overlying the first layer and comprising a second fluoropolymer, wherein the difference between a melting paint of the first layer and a melting point of the second layer is at least about 10° C.;
   wherein the polymer film is in the form of a sheet, the first layer fanning an exterior surface of the sheet; and
   wherein the polymer film has an optical clarity of at least 85% light transmission.

31. The polymer film of claim 30, wherein the first layer and the second layer are coextruded.

32. The polymer flint of claim 31, wherein the first layer and the second layer are in direct contact with each other.

33. The polymer film of claim 30, wherein the first fluoropolymer is a copolymer comprising TFE, HEP, and VDF monomer.

34. The polymer flint of claim 30, wherein the second fluoropolymer has a greater number of fluorine atoms than the first fluoropolymer.

35. The polymer film of claim 30, wherein the second fluoropolymer has a greater percentage of fluorinated carbons than the first fluoropolymer.

36. The polymer film of claim 30, wherein the melting point of the first layer is less than 135° C. and the melting point of the second layer is greater than 135° C.

37. The polymer film of claim 36, wherein the melting point of the second layer is at least about 160° C.

38. The polymer film of claim 30, wherein the difference is at least about 25° C.

39. The polymer film of claim 30, wherein the difference is at least about 40° C.

40. The polymer film of claim 30, wherein the difference is at least about 60° C.

41. The polymer film of claim 30, wherein each of the first and second layers are free of chlorinated fluoropolymer.

42. The polymer film of claim 30, wherein the first layer and the second layer consist essentially of respective first and second fluoropolymer.

43. A polymer film comprising:
   a first layer comprising a first fluoropolymer and having a melting point less than 135° C.;
   a second layer overlying the first layer and comprising a second fluoropolymer, the second fluoropolymer comprising a greater fluorine content than the first fluoropolymer;
   wherein the polymer film is in the form of a sheet including first and second exterior surfaces, the first layer forming the first exterior surface of the sheet, the second exterior surface formed of fluoropolymer; and
   wherein the polymer film has an optical clarity of at least 85% light transmission.

44. The polymer film of claim 43, wherein the first layer and the second layer are coextruded.

45. The polymer film of claim 44, wherein the first layer and the second layer are in direct contact with each other.

46. The polymer film of claim 43, wherein the first fluoropolymer comprises fluoropolymer copolymer.

47. The polymer film of claim 46, wherein the fluoropolymer copolymer comprises TFE, HFP, and VDF monomer.

48. The polymer film of claim 43, wherein the second fluoropolymer comprises a fluoropolymer copolymer.

49. The polymer film of claim 43, wherein the second fluoropolymer has a greater percentage of fluorinated carbons than the first fluoropolymer.

50. The polymer film of claim 43, wherein the difference between the melting point of the first fluoropolymer and the melting point of the second fluoropolymer is at least about 10° C.

51. The polymer film of claim 43, wherein the melting point of the first layer is less than 135° C. and the melting point of the second layer is greater than 135° C.

52. The polymer film of claim 43, wherein each of the first and second layers are free of chlorinated fluoropolymer.

53. The polymer film of claim 43, wherein the first layer and the second layer consist essentially of respective first and second fluoropolymer.

54. A polymer film comprising:
   a first layer comprising a first THV copolymer;
   a second layer overlying and in direct contact with the first layer and comprising a second THV copolymer, the second THV copolymer is fluorinated to a greater extent than the first THV copolymer;
   wherein the polymer film is in the form of a sheet having first and second exterior surfaces, the first layer forming the first exterior surface of the sheet, the second exterior surface formed of fluoropolymer; and
   wherein the polymer film has an optical clarity of at least 85% light transmission.

55. The polymer film of claim 54, wherein the first layer and the second layer are coextruded.

56. The polymer film of claim 54, wherein the difference between the melting point of the first layer and the melting point of the second layer is at least about 10° C.

57. The polymer film of claim 54, wherein the melting point of the first layer is less than 135° C. and the melting point of the second layer is greater than 135° C.

58. The polymer film of claim 54, wherein the second THV copolymer has a lower weight percentage of vinylidene fluoride than the first THV copolymer.

59. The polymer film of claim 54, wherein the second THV copolymer has a higher weight percentage of TFE than the first THV copolymer.

60. The polymer film of claim 54, wherein the second THV copolymer has a higher weight percentage of HFP than the first THV copolymer.

61. The polymer film of claim 54, wherein the polymer film has a total film thickness in a range between 2 mils and 5 mils.

62. The polymer film of claim 54, wherein a ratio of the thickness of the second layer to a thickness of the first layer is in a range of about 10:90 to about 30:70.

63. The polymer film of claim 54, wherein the optical clarity is at least about 98% light transmission.

* * * * *

UNITED STATES PATENT AND TRADEMARK OFFICE
CERTIFICATE OF CORRECTION

PATENT NO. : 7,270,870 B2  Page 1 of 1
APPLICATION NO. : 10/862053
DATED : September 18, 2007
INVENTOR(S) : Kevin G. Hetzler et al.

It is certified that error appears in the above-identified patent and that said Letters Patent is hereby corrected as shown below:

Col. 7 Claim 30, line 19, please delete "paint" and insert therefor --point--.

line 22, please delete "fanning" and insert therefor --forming--.

Col. 7 Claim 32, line 27, please delete "flint" and insert therefor --film--.

Col. 7 Claim 43, line 59, please delete "greater" and insert therefor --greater number of--.

line 59, please delete "content" and insert therefor --atoms--.

Signed and Sealed this

Third Day of June, 2008

JON W. DUDAS
*Director of the United States Patent and Trademark Office*